Figure 1:
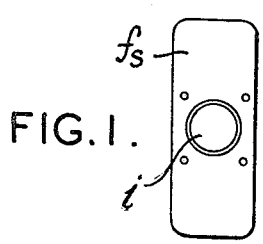

Jan. 1, 1952  P. G. A. H. VOIGT  2,581,223
PERMANENT MAGNET SYSTEM FOR LOUDSPEAKERS
Filed March 4, 1948

INVENTOR
Paul G. A. H. Voigt
BY Harry Langoam
ATTORNEY

Patented Jan. 1, 1952

2,581,223

UNITED STATES PATENT OFFICE 2,581,223

PERMANENT MAGNET SYSTEM FOR LOUDSPEAKERS

Paul Gustavus Adolphus Helmuth Voigt, London, England

Application March 4, 1948, Serial No. 12,912
In Great Britain March 4, 1947

5 Claims. (Cl. 179—119)

This invention relates to the general structure of magnets such as those used in moving coil loudspeakers. It is not however restricted to magnets for that purpose since it is applicable generally to magnets of that type irrespective of use. The invention thus refers generally to magnets that comprise a front plate, an inner yoke member cooperating with the front plate for forming an annular air gap, and at least one outer yoke member forming a return path for completing a magnetic circuit through the inner yoke member, air gap and front plate.

In the case of loudspeaker magnets, particularly those with permanent magnets, in which the permanent magnet material is situated centrally, it is usual to have on the front of the permanent magnet material, a forward projecting flux carrying extension, the end of which forms the inner pole. The said inner pole is normally located by means of a suitable non-magnetic locating piece, concentrically within the hole in the front plate which forms the outer pole.

The magnetic circuit may conveniently be completed by a flux carrying back plate, one face of which is in contact with the back of the permanent magnet, and a flux carrying tubular yoke member concentric with but well clear of the central magnet and situated in between the back and front plates.

Alternatively, instead of a tube, one, two or more outer yoke members or side pieces may be used. I prefer two members, placed one on each side.

Gaps, or axial mis-alignment will occur if the several dimensions which contribute to the axial length of the central parts do not match up with the corresponding length of the return path.

The lengths of the side pieces (or tube), of the permanent magnet material, and of parts of the extension are inevitably involved. Under certain circumstances every part of the magnetic circuit, and also the non-magnetic locating piece may have its effect, necessitating generally a high order of mechanical accuracy throughout.

It is the object of this invention to diminish the number of parts requiring machining, and especially to diminish the number of parts requiring machining to high accuracy.

This is achieved in the first instance by using a back plate divided across its centre, where it carries no flux. The two halves by separating the small distance necessary to take up dimensional differences can now be sure of making effective magnetic contact between their outer ends and the side pieces.

The overall length of these back plate halves is not critical, and as there is now no need for adjustable side pieces, these can be made all in one with the front plate thereby eliminating both magnetic joints and machined surfaces between front and sides.

In order that this invention may be more readily understood, I shall now refer to Figures 1, 1a, 1b, 2, 2a, 2b, and 3 of the accompanying drawings, which illustrate the aspects discussed so far.

Figure 1A:
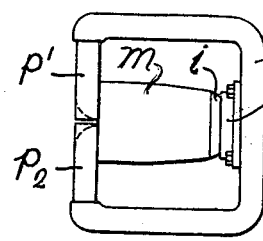
Figure 1B:
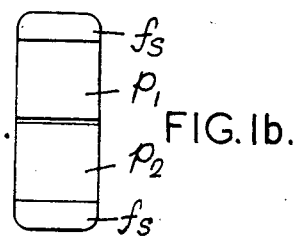

Figure 1 illustrates the arrangement with two outer yoke members of side pieces made in one piece with the front plate producing the U-shaped member $fs$, Figure 1a being the front view showing the front plate $f$ with the large circular hole that forms the outer pole. Concentric within this hole is the inner pole $i$. Figure 1b is a side view showing the U-shaped member $fs$ edge on, and the locating piece $l$ whereby the flux carrying extension $i$ which ends in the inner pole is correctly located with respect to the outer pole. The part $m$ is the block of high retentivity permanent magnet material.

Figure 1c is a rear view in which only the back plate $p$ and the side pieces $s$ show.

The back plate is divided into two parts $p_1$ and $p_2$. The back plate halves may be shaped as shown dotted, since those two corners near the axis are not necessary for carrying flux.

The back plate, whether in one piece or divided is made to suit.

To increase the total length of the permanent magnet material without increasing the overall dimensions, or to reduce the overall dimensions without loss of effective length of such material, the back plate halves can be shortened still further, and blocks of additional permanent magnet material introduced between the ends of the doubly shortened back plate halves and the side pieces. When magnetising, steps must of course be taken to ensure that all the magnetic material is magnetised correctly.

Figure 2:
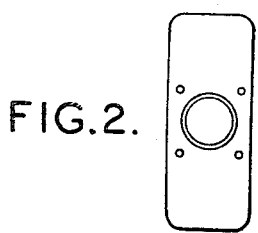
Figure 2A:
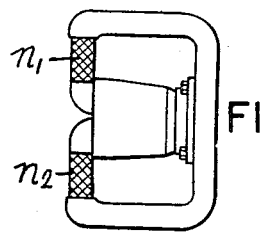
Figure 2B:
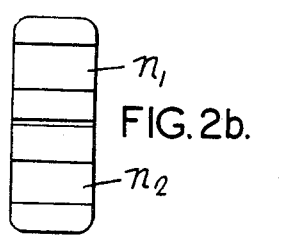

The arrangement with multiple blocks of magnetic material is shown in Figure 2, the additional blocks $n_1$, $n_2$ being shown shaded. It will be noted that there is very little left now of the back plate halves which lie in between the additional blocks. This is because $n_1$ and $n_2$ are now parts of the back plate.

Alternatively, a simpler construction, and one which reduces the number of magnetic joints is to use a T or Y shaped magnet block in which the right and left hand extremities are faced parallel to one another and at right-angles to the end of the stem. With this construction accurate spacing of the side pieces again becomes necessary unless they are adjustable or springy. If, however, two L or J shaped or curved magnets are used, and are placed one right handed and one left handed back to back with a small space in between, then machining the side pieces to fine tolerances or making them adjustable can again be avoided since slight variations in the distances between the side pieces only results in slight variations in the small clearance between the backs of the two magnets.

The magnets with their contact surfaces readily take up their correct positions with respect to the remainder of the magnetic circuit. I find assembly easier if the magnets are slightly magnetised beforehand.

Figure 3:
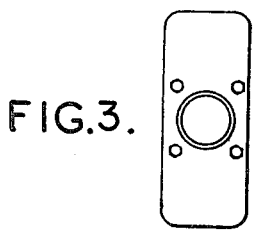
Figure 3A:
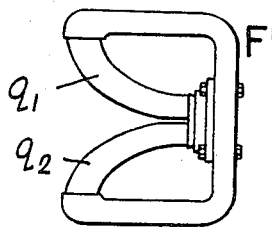
Figure 3B:
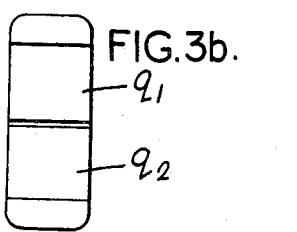

Figure 3 shows the arrangement with curved magnets, $q_1$, $q_2$ respectively being the curved magnets. Other parts are as before, except that in this case I have shown the locating piece as fastened by nuts and bolts which pass right through the front plate. By doing this, they may serve the double purpose of providing also means for fastening the diaphragm support. No means for holding the rest of the magnetic structure together have been shown. Once the magnet block has been magnetised, magnetic forces will tend to make additional holding means quite unnecessary. As a precaution however, additional holding means may be provided, as by a shaped cover which is a close fit, a "belt" may be put round the magnet and engage with bolts through the side pieces, countless other methods will occur immediately to anyone skilled in design. In the case of a tubular return path, a plurality of curved magnets could be used.

Figure 4:
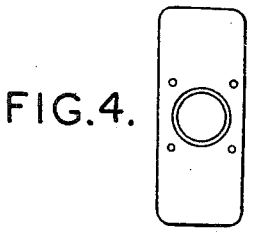
Figure 4A:
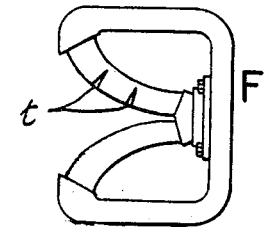
Figure 4B:
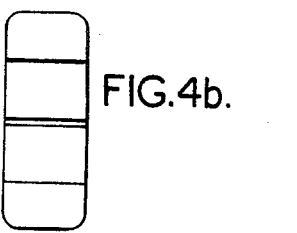

Modern magnetic material cannot be used at maximum efficiency in a curved magnet if there is a large ratio between inner and outer diameter. Therefore, by reducing the amount of change of direction at one or both ends, increased efficiency results. In the curved magnet of Figure 3, the planes of the two ends intersect at right-angles, corresponding to a change of direction of 90°. In Figure 4 is shown an arrangement in which a magnet of much slower curvature is used, the change of direction being much less than with the previous magnet. For proper contact however, the contact surfaces on the side pieces, and/or on the flux carrying extension have to be machined at the appropriate angle.

For still more efficient utilisation of the costly magnetic material, the curved pieces may be cast initially with low cost low reluctance inserts as shown at $t$ in Figure 4. With such inserts the difference in path length round the inner and outer parts of the curve can be made negligible. Since the planes at the ends of the magnet are not parallel however, the positioning of the magnet will still permit it to take up dimensional tolerances.

In Figure 4, the locating piece is assumed to be a die casting having projections which register into the small holes in the front plate around the gap. When assembling, the wedging action which can be exerted with the magnets can easily be used to drive the flux carrying extension and the locating piece into their correct positions.

This invention is not confined to the exact arrangement illustrated, but refers generally to magnets incorporating the ideas disclosed, which provide a construction in which accurate workmanship and/or adjustment may be confined to the gap and the means of locating its relative parts, other machined surfaces being reduced to a minimum in number and having wide dimensional tolerances, a portion of the magnetic structure having contact surfaces at an angle to one another, so that by adjusting its position, axial and radial tolerances can be taken up.

In the appended claims, the expression "yoke member" means a part of the magnetic construction included in its magnetic circuit.

I claim:

1. A permanent magnet system comprising a front plate having a pole-forming aperture and two outer yoke members integral with said front plate and extending rearwardly therefrom on opposite sides of said aperture, an inner yoke member cooperating with said front plate for forming an annular air gap in said aperture, spacing means for maintaining said inner yoke member correctly positioned with respect to said aperture for forming said air gap and two separate yoke members each cooperating with only one of said outer yoke members and effective for completing the magnet circuit through said outer yoke member, inner yoke member, air gap and front plate, each of said separate yoke members having an outwardly-facing joint surface contacting the cooperating outer yoke member and a forwardly-facing joint surface contacting said inner yoke member.

2. A permanent magnet system comprising a front plate of low magnetic reluctance material having a pole-forming aperture and two outer yoke members of low magnetic reluctance material integral with said front plate and extending rearwardly therefrom on opposite sides of said aperture, said outer yoke members having inwardly-facing plane joint faces; a magnet extension piece of low magnetic reluctance material cooperating with said front plate for forming an annular air gap in said aperture, said extension piece having a rearwardly facing joint surface; spacing means for maintaining said magnet extension piece correctly positioned with respect to said aperture for forming said air-gap; and two curved pieces of high retentivity permanent magnet material each cooperating with only one of said outer yoke members for completing the magnetic circuit through said yoke member magnet extension piece, air-gap and front plate, each of said curved pieces of magnet material having an outwardly-facing joint surface in contact with the inwardly-facing joint surface of the cooperating outer yoke member and a forwardly-facing joint surface contacting the rearwardly-facing joint surface of said magnet extension piece.

3. A permanent magnet system comprising a front plate of low magnetic reluctance material having a pole-forming aperture and two outer yoke members of low magnetic reluctance material integral with said front plate and extending rearwardly therefrom on opposite sides of said aperture, said outer yoke members having inwardly facing plan parallel joint surfaces; a permanent magnet element composed of a block of high-retentivity permanent magnet material disposed between said outer yoke members, said magnet element having a rearwardly-facing plane joint surface at right angles to said plane parallel joint surfaces; a magnet extension piece of low magnetic reluctance material constituting a forward extension of said permanent magnet element and cooperating with said front plate for forming an annular air gap; spacing means for maintaining said magnet extension piece correctly positioned with respect to said aperture for forming said air-gap; and two separate yoke members each cooperating with only one of said outer yoke members for completing the magnetic circuit through said yoke member, permanent magnet element, extension piece, air-gap and front plate, each of said separate yoke members having an outwardly-facing joint surface in contact with the inwardly-facing joint surface of the cooperating outer yoke member and a forwardly-facing joint surface in contact with the rearwardly-facing joint surface of said magnet element.

4. A permanent magnet system as claimed in claim 3, where-in each of said separate yoke members is made partly of low magnetic reluctance material and partly of high retentivity permanent magnet material.

5. A permanent magnet system comprising a front plate of low magnetic reluctance material having a pole-forming aperture and two outer yoke members of low magnetic reluctance material integral with said front plate and extending rearwardly therefrom on opposite sides of said aperture; said outer yoke members each having an inwardly and forwardly facing plane joint face; a magnet extension piece of low magnetic reluctance material cooperating with said front plate for forming an annular air-gap in said aperture, said extension piece having two plane joint faces each facing rearwardly and outwardly towards one of said outer yoke members; spacing means for maintaining said magnet extension piece correctly positioned with respect to said aperture for forming said air-gap; and two pieces of high retentivity permanent magnet material each cooperating with only one of said outer yoke members for completing the magnetic circuit through said yoke member, magnet extension piece, air-gap and front plate, each of said pieces of magnet material having a rearwardly and outwardly facing joint surface in contact with the inwardly-facing joint surface of the cooperating outer yoke member and a forwardly and inwardly facing joint surface in contact with the corresponding rearwardly and outwardly facing joint surface of said magnet extension piece.

PAUL GUSTAVUS ADOLPHUS
          HELMUTH VOIGT.

REFERENCES CITED

The following references are of record in the file of this patent:

UNITED STATES PATENTS

| Number | Name | Date |
|---|---|---|
| 1,758,797 | Kellogg | May 13, 1930 |
| 1,834,995 | Bathrick | Dec. 8, 1931 |
| 1,856,774 | Mayer | May 3, 1932 |
| 1,875,004 | Horsburgh | Aug. 30, 1932 |
| 1,895,071 | Fanger | Jan. 24, 1933 |
| 1,920,299 | Fanger | Aug. 1, 1933 |
| 1,976,874 | Brzeski | Oct. 16, 1934 |
| 1,991,526 | Tichenor | Feb. 19, 1935 |
| 2,029,282 | Serge | Jan. 28, 1936 |
| 2,085,721 | Warnke | June 29, 1937 |
| 2,141,595 | Cornwell | Dec. 27, 1938 |
| 2,174,355 | Sundstrom | Sept. 26, 1939 |
| 2,501,032 | Harbaugh | Mar. 21, 1950 |